(12) United States Patent
Niwa et al.

(10) Patent No.: US 8,179,081 B2
(45) Date of Patent: May 15, 2012

(54) DRIVER CIRCUIT

(75) Inventors: Yoshihiro Niwa, Gifu (JP); Kazumasa Takai, Kagamigahara (JP); Toshiyuki Shutoku, Tsushima (JP); Takeshi Naganuma, Inazawa (JP); Tomofumi Watanabe, Gifu (JP)

(73) Assignees: Sanyo Semiconductror Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 254 days.

(21) Appl. No.: 12/772,445

(22) Filed: May 3, 2010

(65) Prior Publication Data

US 2010/0289444 A1 Nov. 18, 2010

(30) Foreign Application Priority Data

May 13, 2009 (JP) .................................. 2009-116226

(51) Int. Cl.
*H02P 8/00* (2006.01)

(52) U.S. Cl. ....................... 318/696; 318/685; 318/800

(58) Field of Classification Search .................. 318/696, 318/685, 800, 807, 729, 811, 808, 810, 727, 318/767, 798, 812
See application file for complete search history.

(56) References Cited

U.S. PATENT DOCUMENTS

2003/0226704 A1* 12/2003 Aoki et al. .................... 180/271

FOREIGN PATENT DOCUMENTS

| JP | 8-37798 | 2/1996 |
| JP | 2006-288056 | 10/2006 |

* cited by examiner

*Primary Examiner* — Karen Masih
(74) *Attorney, Agent, or Firm* — McDermott Will & Emery LLP

(57) ABSTRACT

A stepping motor includes two coils and has supply currents to the two coils with different phases so that a rotor is rotated by the two coils. During a period where one coil is in a high impedance state, an induced voltage generated at that coil is detected. An output control circuit controls the magnitude of motor drive current supplied to the two coils in accordance with the detected induced voltage state. Then, prior to entering the high impedance state from the drive state, a short-circuit period is provided for short circuiting both terminals of the coil.

5 Claims, 9 Drawing Sheets

DRIVER CIRCUIT

CROSS-REFERENCE TO RELATED APPLICATIONS

The entire disclosure of Japanese Patent Application No. 2009-116226 filed on May 13, 2009, including specification, claims, drawings, and abstract, is incorporated herein by reference in its entirety.

BACKGROUND

1. Technical Field

The present invention relates to a driver circuit for a stepping motor, which includes two coils and has drive voltages with different phases applied to these two coils so that a rotor driven by the coils is rotated.

2. Related Art

Among the various types of motors available, one representative type of motor capable of precisely determining position is a stepping motor. Stepping motors are widely utilized in various apparatuses, for example, in focusing and anti-shake mechanisms in cameras and for positioning in machine tools.

The stepping motor is generally driven by changing the rotating position of the rotor by a current ratio to two stator coils. Therefore, if the rotor is rotated in accordance with the phase of current to the coils, the rotor rotates a predetermined amount regardless of the amount of current to the coils. Accordingly, the amount of current to the coils is generally set sufficiently large so that the rotor can rotate reliably.

SUMMARY

Here, there is a need to minimize as much as possible the power consumption in electrical equipment. In particular, this need is large for battery-driven portable equipment. On the other hand, in the drive of the stepping motor, setting the amount of current to a magnitude where the rotor can be reliably rotated signifies extra current is being sent to the coil and extra power is being consumed.

The present invention relates to a driver circuit for a stepping motor. The stepping motor includes two coils and has drive voltages to the two coils with different phases so that a rotor driven by the coils is rotated. In a high impedance period where one coil is in a high impedance state, an induced voltage generated at that coil is detected. The magnitude of motor drive current supplied to the two coils is controlled in accordance with the detected induced voltage state and prior to entering the high impedance state from the drive state, a short-circuit period is provided for short circuiting both terminals of the coil.

Furthermore, it is preferable to disable conduction near inversion of the polarity of the drive voltage where contribution to the rotational force on the rotor is small and to set this period as the short-circuit period and high impedance period.

Providing the high impedance period enables the induced voltage to be measured. On the basis of the measured induced voltage, the motor drive power can be controlled. Noise due to kickback generated in the high impedance state can be reduced.

DETAILED DESCRIPTION

Embodiments of the present invention will be described hereinafter with reference to the attached drawings.

Figure 1:
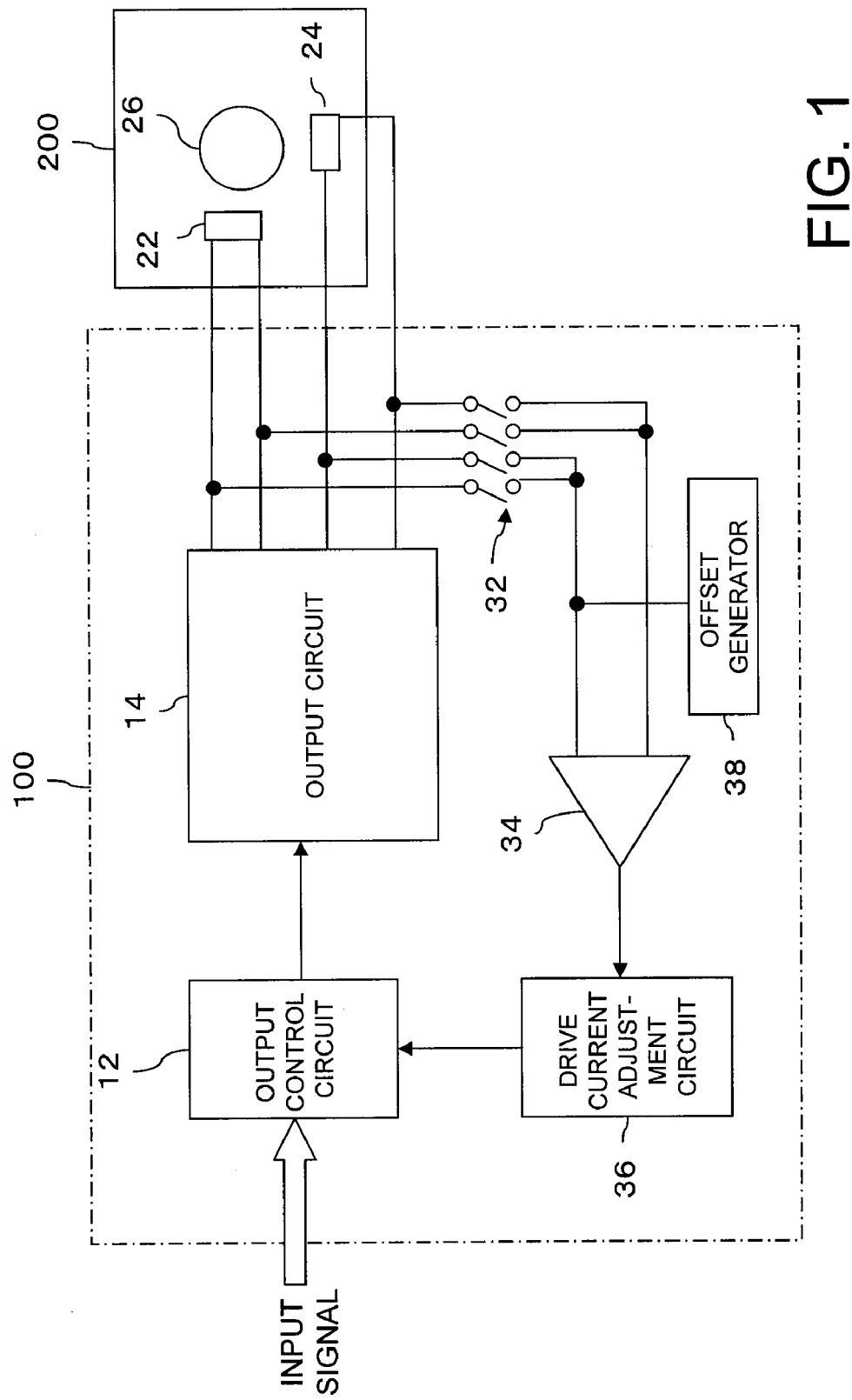
FIG. 1 shows an overall configuration of a system including a driver circuit relating to an embodiment.

FIG. 1 shows an overall configuration where a system is composed of a driver 100 and a motor 200. An input signal is input by the driver 100 and the driver 100 supplies a drive current to the motor 200 in accordance with the input signal. As a result, rotation of the motor 200 is controlled in accordance with the input signal.

Here, the driver 100 includes an output control circuit 12 and the input signal is supplied to the output control circuit 12. The output control circuit 12 determines the drive waveform (phase) at a predetermined frequency in accordance with the input signal and determines the amplitude of the drive current by PWM control to create a drive control signal. Then, the created drive control signal is supplied to an output circuit 14.

The output circuit 14 is composed of a plurality of transistors, the switching of which controls current from a power supply and generates a motor drive current, which is supplied to the motor 200.

The motor 200 is a stepping motor and has two coils 22 and 24 and a rotor 26. The two coils 22 and 24 are arranged so as to be positionally displaced at an electrical angle of 90° to each other. Therefore, the direction of the magnetic fields with respect to the rotor 26 at the rotor central angle is also displaced at an electrical angle of 90° to each other. Furthermore, the rotor 26 includes a permanent magnet, for example, and its position where it is stable is determined in accordance with the magnetic field from the two coils 22 and 24. Namely, regarding the angle of rotation of the rotor, by supplying alternating currents having a phase difference of 90° to each other to the two coils arranged at positions displaced by 90°, the current phases make it possible to move and rotate the rotor 26. Furthermore, at a timing of a specific current phase, stopping the change in current phase makes it possible to stop the rotor at a position in accordance with the current phase at that time. In this manner, the rotation of the motor 200 is controlled.

The voltages of the current paths to the two coils 22 and 24 are supplied to a comparator 34 via a switch 32. Here, the switch 32 sequentially selects the voltage of the current path supplied to one of the two coils 22 and 24 to the comparator 34. Therefore, to the comparator 34 the voltages applied to the coils 22 and 24 are sequentially supplied. The comparator 34 compares the voltages applied to both terminals of the coils 22 and 24 and generates a signal regarding the result thereof.

The comparator 34 supplies the signal regarding the comparison result to a drive current adjustment circuit 36. The drive current adjustment circuit 36 determines current amplitude to the motor 200 on the basis of the comparison result of the comparator 34. Then, an adjustment signal regarding the current amplitude is supplied to the output control circuit 12.

Therefore, the output control circuit 12 generates a drive control signal from the input signal and the adjustment signal. Furthermore, an output from an offset generation circuit 38 is connected to one input terminal of the comparator 34. Therefore, an arbitrary offset can be added to the comparison of two inputs according to the offset voltage generated from the offset generation circuit 38. Namely, if the offset is 0, the output of the comparator 34 inverts with the difference 0 of both terminal voltages of the coils 22 and 24 as a boundary and the point thereof can be arbitrarily moved according to the offset voltage.

The comparator 34 and the drive current adjustment circuit 36 correspond to induced voltage detecting means and the output control circuit 12 and the output circuit 14 correspond to controlling means.

Figure 2:
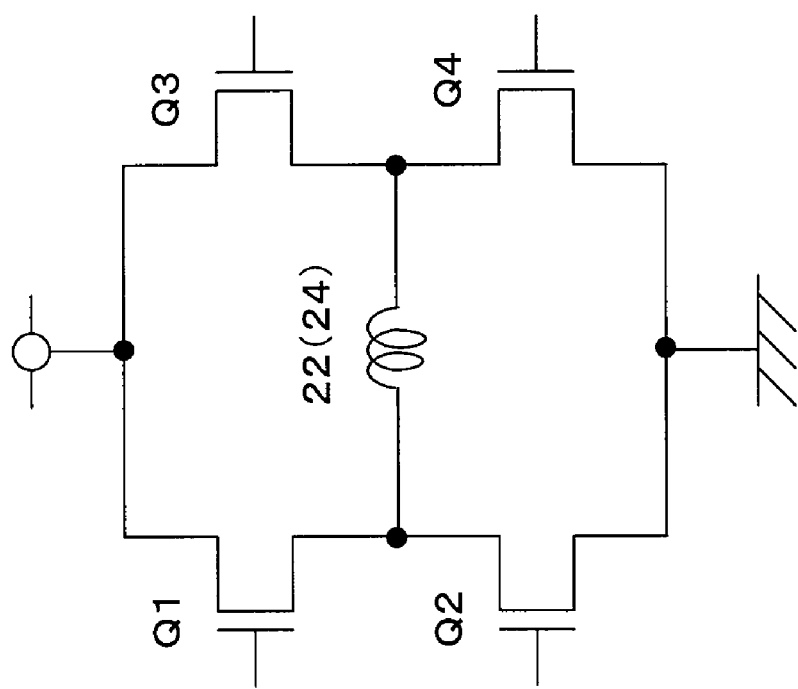
FIG. 2 shows part of an output circuit.

FIG. 2 shows a configuration of part of the output circuit 14 and one coil 22 (24) of the motor 200.

In this manner, an arm composed of two transistors Q1 and Q2 connected in series and an arm composed of two transistors Q3 and Q4 connected in series are provided between the power supply and ground and the coil 22 (24) is connected to a midpoint between the transistors Q1 and Q2 and to a midpoint between the transistors Q3 and Q4. Then, by turning on the transistors Q1 and Q4 and turning off the transistors Q2 and Q3, a current flows in one direction to the coil 22 (24), and by turning off the transistors Q1 and Q4 and turning on the transistors Q2 and Q3, a current flows in the opposite direction to the coil 22 (24) so as to drive the coils 22 and 24.

Providing two of these circuits enables the currents supplied to the two coils 22 and 24 to be controlled individually.

Figure 3:
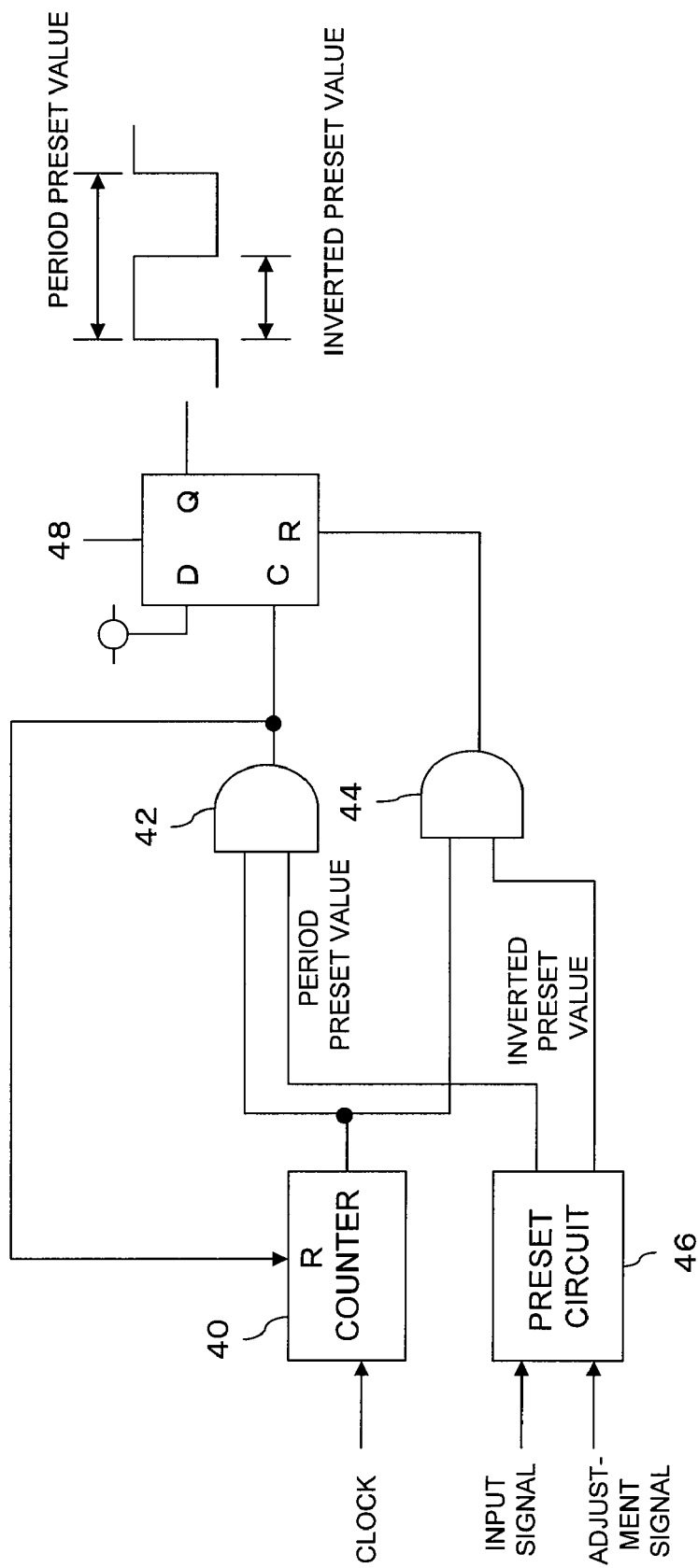
FIG. 3 shows a configuration of an output control circuit.

FIG. 3 shows a configuration of the output control circuit 12. A predetermined clock is supplied to a counter 40 and the counter 40 sequentially increments the clock. A multi-bit signal output by the counter 40 is input by AND circuits 42 and 44. To the other input terminal of the AND circuit 42 is input a period preset value, which is represented by the same number of bits as the output of the counter 40 and supplied from a preset circuit 46. Therefore, the AND circuit 42 outputs an H level when the count value of the counter 40 and the period preset value match. Then, the output of the AND circuit 42 is connected to a reset terminal of the counter 40. Therefore, the counter 40 counts clocks and is reset by the output of the AND circuit 42 when the count value thereof matches the period preset value. Namely, the counter 40 repeatedly counts to the period preset value.

On the other hand, to the other input terminal of the AND circuit 44, an inverted preset value from the preset circuit 46 is supplied. Therefore, an H level is output from the AND circuit 44 when the output of the counter 40 reaches the inverted preset value.

The output of the AND circuit 42 is supplied to a clock input terminal C of a flip-flop 48 and the output of the AND circuit 44 is supplied to a reset terminal of the flip-flop 48. A D input terminal of the flip-flop 48 is set to an H level. Therefore, an H level is set when the value of the counter 40 reaches the period preset value, an L level is restored when the inverted preset value is reached, and this is repeated. Therefore, at the output of the flip-flop 48, a rectangular wave (PWM waveform) is obtained where one period is determined by the period preset value and the H level period (duty ratio) is determined by the inverted preset value.

Figure 4:
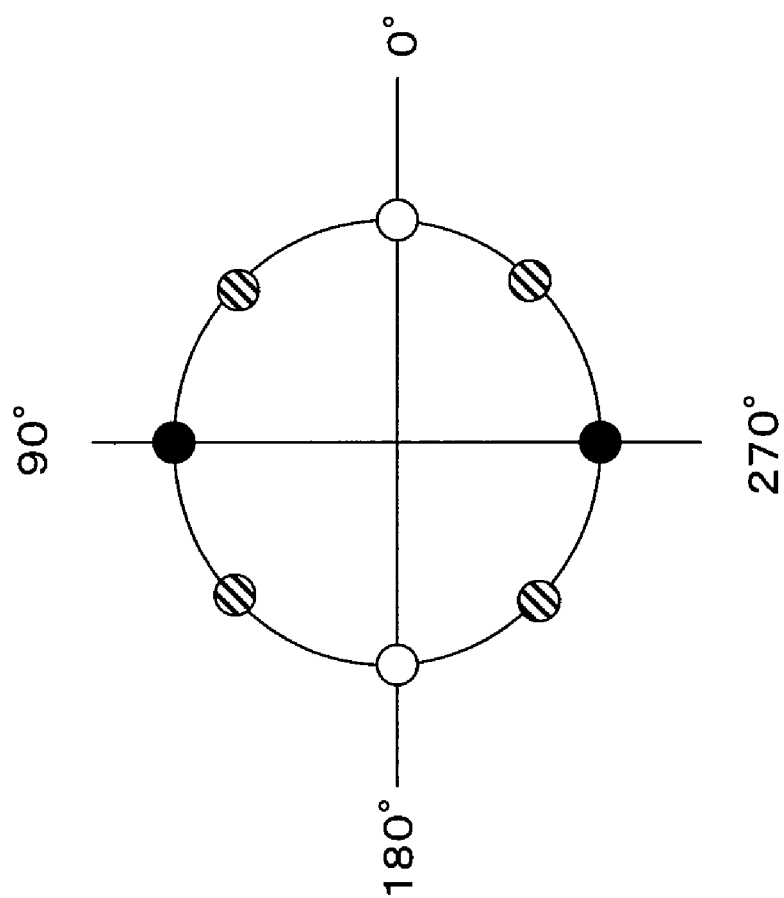
FIG. 4 shows rotational phase.

Then, to the preset circuit 46 are supplied an input signal and an adjustment signal from the drive current adjustment circuit 36. The input signal is a rotation control command for the motor 200 that determines the period preset value and the time of one rotation (rotational speed). Here, FIG. 4 shows the rotational phase of the motor. At the rotational angle of the rotor represented by electrical angle, the drive current supplied to one coil 22 is 100% at 0° and 180°, 0% at 90° and 270°, and 71% at 45°, 135°, 225°, and 315°. At the other coil 24, the phase differs from this by 90°. Therefore, for 1-2 phase drive (8 periods), for example, setting the preset value to 0, 71, 100, 71, 0, 71, 100, 71, and 0 enables the current for one rotation of the rotator to be divided and controlled in 8 periods in the system controlling the drive current for one coil 22. For the second 100, the current flowing to the coil has a direction opposite to that of the first 100. Furthermore, for the third and fourth 71, the current flowing to the coil has a direction opposite to that of the first and second 71.

Here, the above-mentioned duty ratio represents an instance of driving at maximum torque. Here, if the supply current of the motor 20 is insufficient, the power becomes insufficient and the desired rotational drive is not able to be performed. Accordingly, in the prior art a sufficiently large motor drive current was supplied. However, this type of drive wastes energy.

In the embodiment, the duty ratio is lowered in accordance with the adjustment signal, for example, 71%→57%, 100%→80%, and so forth. This can be easily performed by changing the inverted preset value in accordance with the adjustment signal as described hereinabove. It should be noted the rates of decrease need not be the same.

Figure 5:
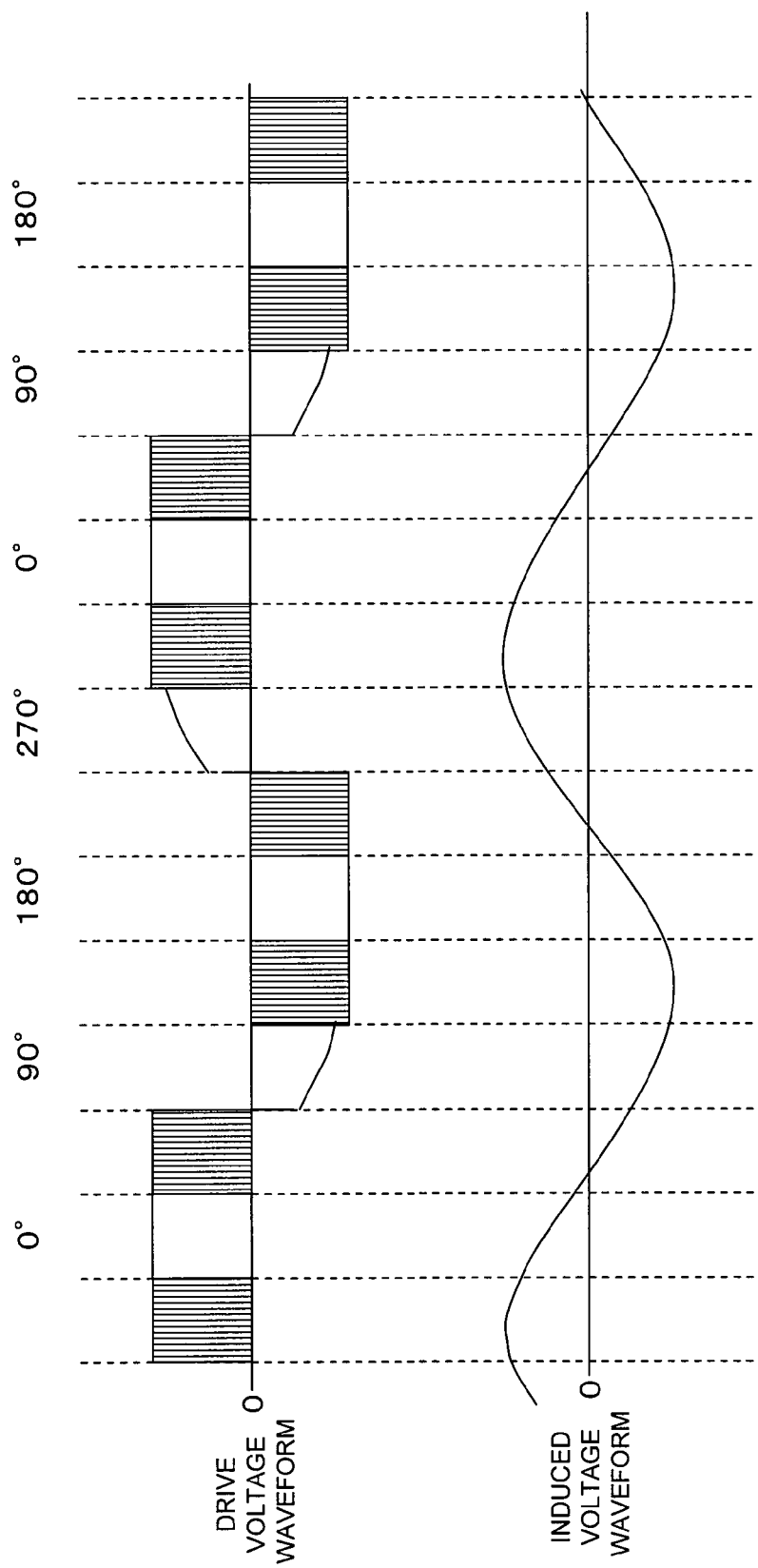
FIG. 5 shows a drive voltage waveform and an induced voltage waveform (excessive power).

Here, FIG. 5 shows a drive voltage waveform and an induced voltage waveform at coil 22 (24) when there is sufficient drive power. The induced voltage waveform does not necessarily become a sine wave but is represented here approximating a sine wave. Furthermore, the drive voltage waveform is a waveform representing a voltage difference of both terminals of the coil 22 (24). Here, at 90° and 270°, the voltage supply to the coil becomes 0 and the transistors Q1 to Q4 shown in FIG. 2 all turn off for a high impedance state. Accordingly, the induced voltage waveform appears directly at the coil. Then, the induced voltage waveform advances in phase compared to the drive voltage waveform. Namely, 0 is already crossed at the beginning of the high impedance period. This is likely due to the rotor rotating early and the induced voltage waveform as a whole being advanced since the current flowing to the other coil is sufficiently large.

When the duty ratio of the drive voltage is lowered, the induced voltage waveform gradually synchronizes with the phase of the drive voltage waveform. Then, the induced voltage waveform becomes delayed with respect to the drive voltage waveform prior to the loss of synchronization where the predetermined rotation cannot be performed. Then, when synchronization is lost, the rotor does not rotate and the induced voltage waveform cannot be obtained.

Figure 6:
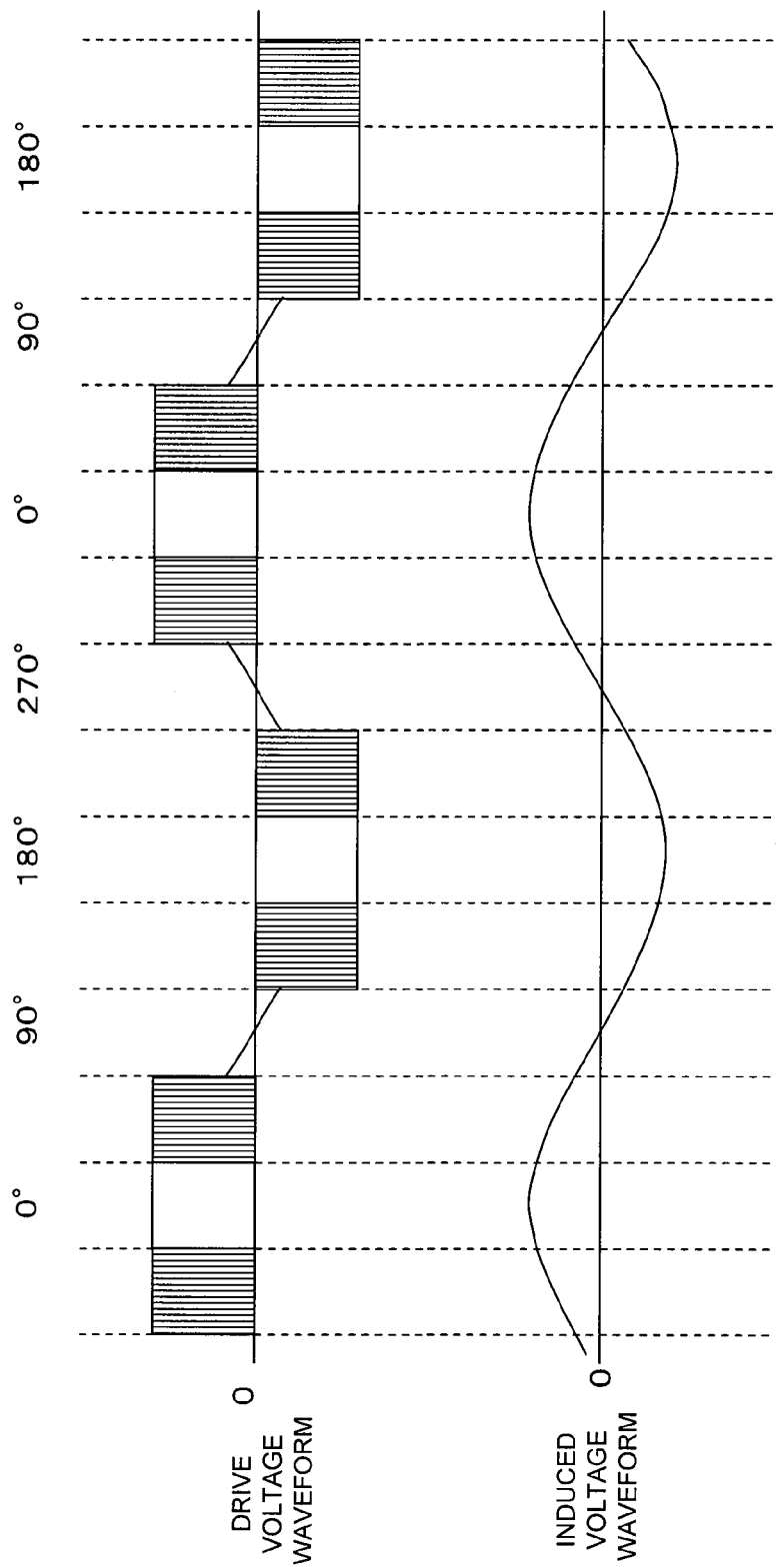
FIG. 6 shows a drive voltage waveform and an induced voltage waveform (appropriate power).

FIG. 6 shows the drive voltage waveform and the induced voltage waveform when an appropriate drive current is supplied. In this manner, zero cross exists near the middle of the high impedance period.

As a result, the zero cross located near the middle of the high impedance period is considered optimum drive. However, the necessary torque for the rotation of the motor 200 may fluctuate so that some margin is necessary to prevent loss of synchronization. In particular, when torque fluctuation is large, a sufficient margin becomes necessary in the drive current.

In the embodiment, the switch 32 in FIG. 1 selects the high impedance period for coil 22 (24) and supplies the coil terminal voltage to the comparator 34. Therefore, the zero cross timing of the induced voltage can be detected from the timing where the output of the comparator 34 inverts. Although not shown, the high impedance period of the coil 22 (24) is identified in the output control circuit 12 and the switch 32 is controlled by a signal from the output control circuit 12 so that it is desirable for the drive current adjustment circuit 36 to detect the timing where the output of the comparator 34 inverts in the high impedance period.

Furthermore, a signal from the offset generation circuit 38 enables the drive power to be set relatively high or to an optimum value. In general, depending on the application of the motor 200, the extent of extra power to be set can be determined in advance so that it is desirable to set the output of the offset generation circuit 38 to a fixed value at the factory. However, in accordance with the occurrence of loss of synchronization, the offset may be automatically increased thereafter, or set to be variable or further adjustable by a user.

Furthermore, it is preferable for the drive current adjustment circuit 36 to output the adjustment signal to maintain the existing drive when zero cross of the induced voltage waveform is within a predetermined period (for example, ±25% of the middle of the high impedance period) and to generate a signal to increase or decrease the drive current when outside this period.

A method for comparing by adding an offset is not limited to the above-mentioned example and another method may be employed. For example, the coil terminal voltage may be amplified and this may be compared with a variable reference voltage. The reference voltage may be provided by digital to analog conversion of a digital value read from a resistor or division of a power supply voltage by resistors. The offset generation circuit 38 can also employ similar voltage generating means.

Furthermore, it is also preferable to sample only one zero cross in either the rising or falling direction in the output of the comparator 34. It is possible the zero cross position differs in the rising direction and the falling direction. Sampling only one enables a more stable control to be performed.

In this manner, according to the embodiment, the drive power for the motor can be set to an appropriate value so that wasteful power consumption can be suppressed. In particular, since the induced voltage is detected and in accordance with this state the motor drive power is controlled, loss of synchronization can be prevented and power saving can be designed.

Namely, an appropriate motor drive control can be performed in accordance with the motor rotation drive state, such as motor load state and speed.

Furthermore, when the motor is driven at high power, the rotor is rotated by a power higher than necessary so that pulsations and noise may be generated. According to the embodiment, the generation of noise can be suppressed.

Furthermore, this control obviates the need for a rotation position detector for the rotor, such as a Hall device. Therefore, lower cost and reduced wiring can be designed and an effect can also be obtained where the need for mounting space for a detector can be further obviated. Furthermore, since there is no Hall device, resistance to high temperature is improved and in addition drive current loss also does not occur during detection.

Figure 7:
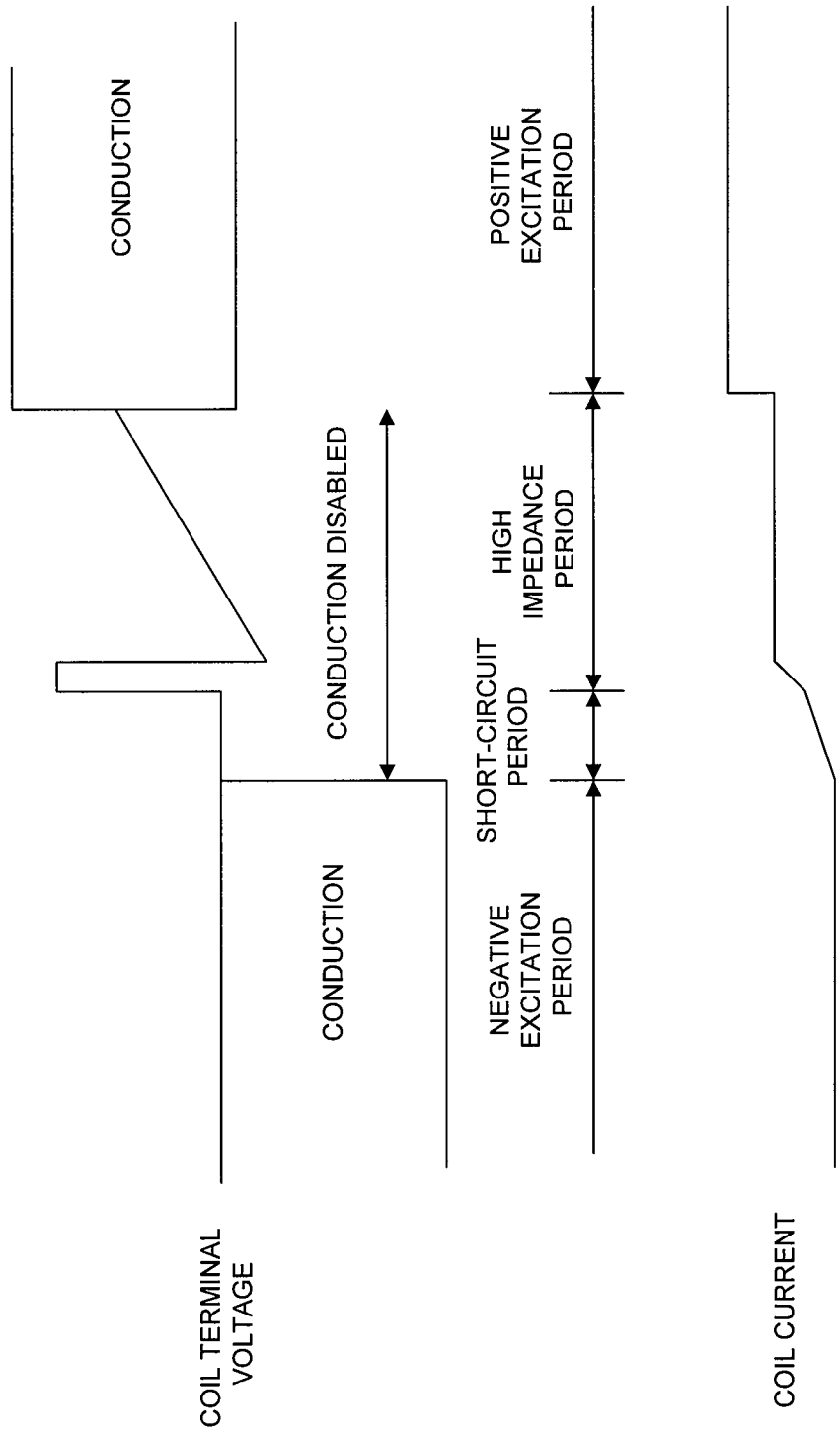
FIG. 7 shows a state of coil terminal voltage and coil current.

Here, the induced voltage waveforms shown in FIG. 5 and FIG. 6 described above are shown with kickback omitted. Namely, in practice, when the motor drive voltage is turned off, together with stoppage of the coil current at the time a kickback voltage is generated. FIG. 7 shows the state of the coil terminal voltage and coil current and the state of the coil current control.

Namely, as described above, when conduction is disabled at the interval near the point (zero cross) where the polarity of the drive voltage inverts and the induced voltage at the time is measured as the high impedance state, kickback occurs immediately after conduction is stopped. Then, due to this kickback, noise may be generated.

Accordingly, in the embodiment, regarding the disabling of conduction, both terminals of the coil are initially short circuited. Namely, the transistors Q1 and Q3 in FIG. 2 are turned off and the transistors Q2 and Q4 are turned on so that both terminals of the coil 22 (or 24) are connected to ground and short circuited. Then, after short circuiting for a predetermined period, the transistors Q2 and Q4 are turned off and the coil 22 (or 24) is set to a high impedance state. As a result, an induced voltage appears at the terminals of the coil 22 (or 24) and detecting this enables the above-mentioned drive power control to be performed.

Here, in the non-conduction period, if the short-circuit period is set too long, the high impedance period becomes short thereby increasing the possibility that voltage measurement cannot be reliably performed. Accordingly, it is preferable to set the short-circuit period so as to ensure a sufficient high impedance period.

In this manner, although inserting the short-circuit period causes kickback itself to occur, noise generation due to kickback can be suppressed. As shown in FIG. 7, a waveform due to kickback is generated after the short-circuit period terminates. At this time, the coil terminal voltage value due to kickback changes only a small amount compared to when the short-circuit period is not inserted. However, the period where the coil terminal voltage value is high due to kickback becomes short compared to when the short-circuit period is not inserted. Furthermore, the change in the current flowing to the coil becomes gradual compared to when the short-circuit period is not inserted. Thus, noise generation due to kickback can be suppressed.

Current is supplied to the other coil 24 (or 22) and it is preferable to measure the induced voltage at a timing to avoid the on-off timing in the PWM control of the other coil 24 (or 22).

Furthermore, it is also possible to increase the number of coils or increase the number of rotor poles and it is also possible to arrange the coils at 0° and 45° positions.

In the embodiment, power saving can be designed by disabling conduction near zero cross where contribution is small even if conduction is enabled to the coil 22 (24). In addition, further power saving can be designed by detecting the induced voltage in the high impedance period and controlling the position of the zero cross to near zero of the conduction phase to set an appropriate conduction voltage. Furthermore, providing the short-circuit period at the beginning of the conduction disable period enables noise generation due to kickback to be suppressed.

Although the embodiment has a configuration using the comparator 34 to detect the induced voltage, the present invention is not limited to this configuration. For example, as shown in FIG. 8, a differential amplifier circuit 74 and an analog-to-digital converter circuit (ADC) 76 can be used to detect the induced voltage.

The voltages of the current paths to the two coils 22 and 24 are supplied to the differential amplifier circuit 74 via a switch 72. Here, the switch 72 sequentially selects to the differential amplifier circuit 74 the voltage of the current path supplied to one of the two coils 22 and 24. Therefore, the voltages applied to the coils 22 and 24 are sequentially supplied to the differential amplifier circuit 74. The differential amplifier circuit 74 amplifies the difference of the voltages applied to both terminals of the coils 22 and 24 and generates an amplified analog signal.

The differential amplifier circuit 74 supplies the amplified analog signal to the ADC 76. The ADC 76 indicates the difference of the voltages applied to both terminals of the coils 22 and 24 and generates, for example, an 8-bit digital signal. The drive current adjustment circuit 36 determines the current amplitude to the motor 200 on the basis of the 8-bit output signal of the ADC 76. Then, an adjustment signal for the current amplitude is supplied to the output control circuit 12.

Figure 8:
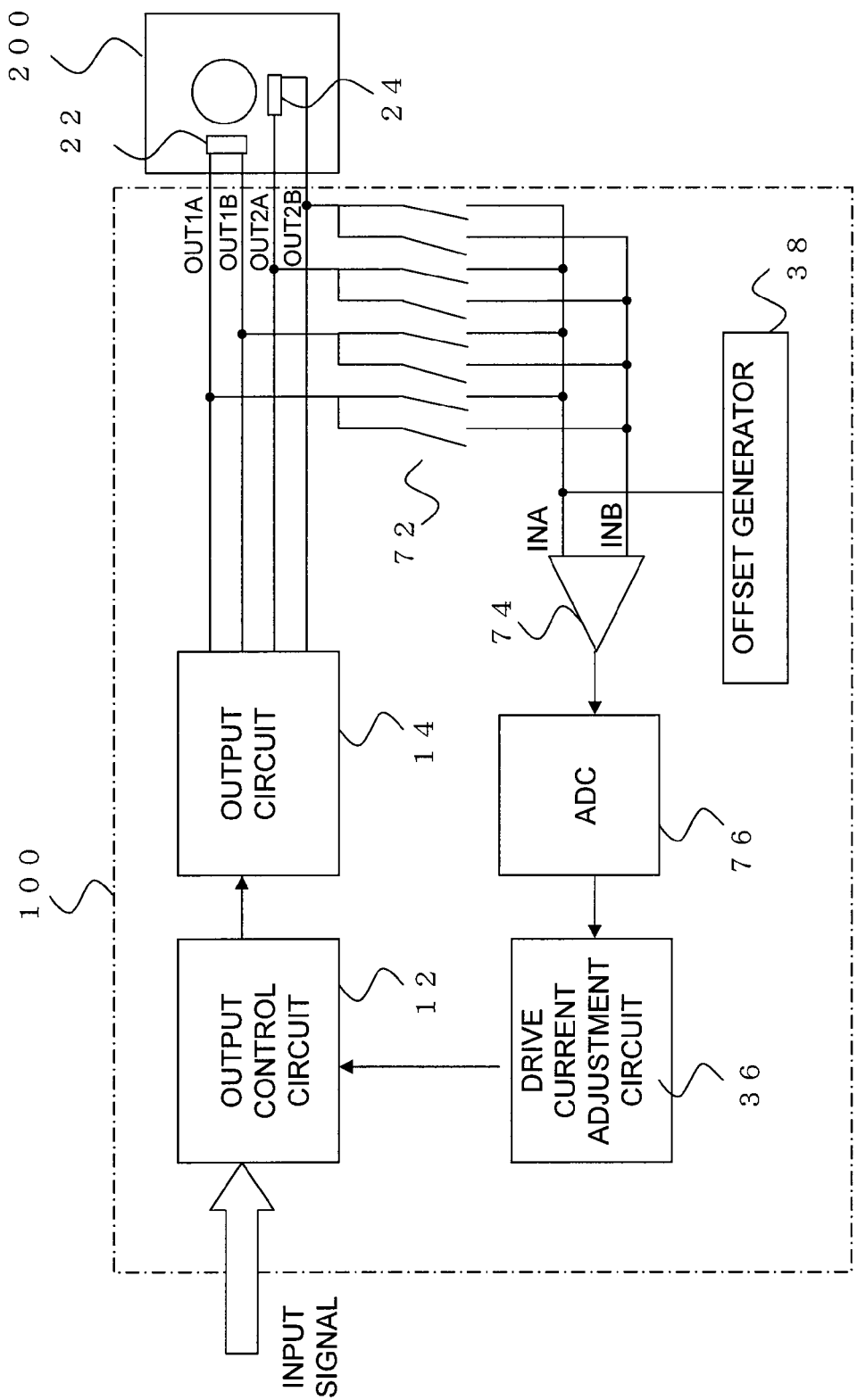
FIG. 8 shows an overall configuration of a system including a driver circuit relating to another embodiment.

In the driver 100 shown in FIG. 8 the drive current adjustment circuit 36 can monitor the induced voltage from the motor 200 on the basis of a multiple bit digital value so that the drive current adjustment circuit 36 can preferably perform generation processing of an adjustment signal. For example, if the digital signal output by the ADC 76 is greater than a predetermined threshold, an adjustment signal for reducing the current amplitude to the motor 200 is generated. Furthermore, if the digital signal output by the ADC 76 is less than the predetermined threshold, an adjustment signal for increasing the current amplitude to the motor 200 is generated. In this manner, controlling the amount of change in the adjustment signal in accordance with the value of the digital signal output by the ADC 76 enables control to be performed so that optimum current amplitude is obtained quickly.

When using the driver 100 shown in FIG. 8, it is preferable to use the switch 72, which can selectively connect the terminals OUT1A, OUT1B, OUT2A, and OUT2B of the coils 22 and 24 to the input terminals INA and INB of the differential amplifier circuit 74.

When detecting the difference in the voltage applied to both terminals of the coil 22, the terminal OUT1A is connected to the input terminal INA and the terminal OUT1B is connected to the input terminal INB. At this time, the differential amplifier circuit 76 outputs the waveform shown in FIG. 9 (A). In this case, the detected induced voltage OUT1A-OUT1B outputs two patterns of waveforms, such as phases 90° and 270° of FIG. 9 (A), so that the drive current adjustment circuit 36 must be prepared to handle two patterns of waveforms, thereby increasing circuit size.

Figure 9:
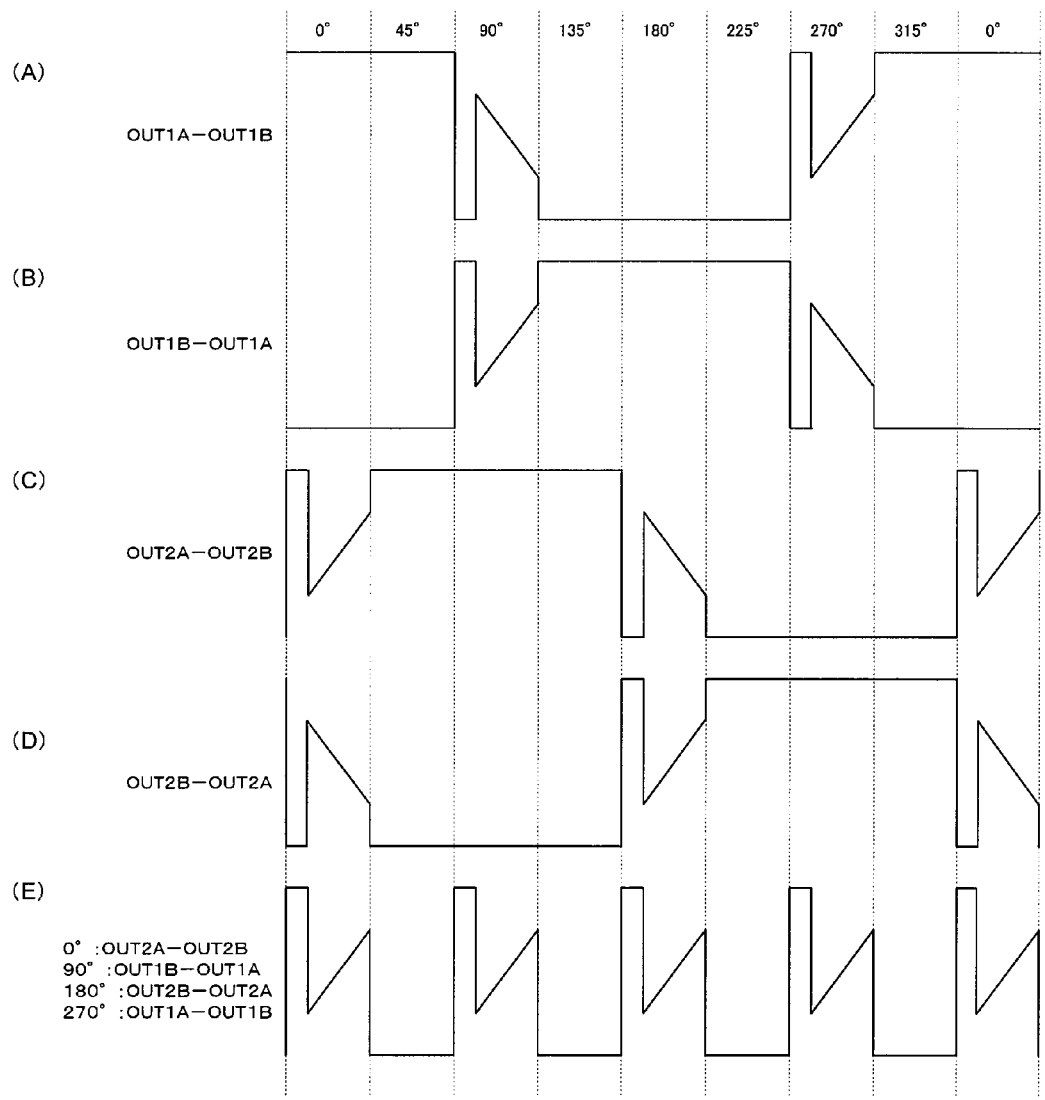
FIG. 9 shows a drive waveform and an induced voltage waveform of the coils in the embodiment of FIG. 8.

Accordingly, in the case of phase 90°, the terminal OUT1A is connected to the input terminal INB and the terminal OUT1B is connected to the input terminal INA so that OUT1B-OUT1A shown in FIG. 9 (B) is obtained. On the other hand, in the case of phase 270°, the terminal OUT1A is connected to the input terminal INA and the terminal OUT1B is connected to the input terminal INB so that OUT1A-OUT1B shown in FIG. 9 (A) is obtained. As a result, the differential amplifier circuit 76 outputs OUT1A-OUT1B or OUT1B-OUT1A depending on phase and the induced voltage shown in FIG. 9 (E) can be monitored as only one pattern of the waveform rising to the right. Thus, this obviates the need to prepare the drive current adjustment circuit 36 to handle two patterns of waveforms and can prevent the circuit size of the driver 100 from increasing.

Similarly, when detecting the difference in the voltage applied to both terminals of the coil 24 at phase 0°, the terminal OUT2A is connected to the input terminal INA and the terminal OUT2B is connected to the input terminal INB so that OUT2A-OUT2B shown in FIG. 9 (C) is obtained. On the other hand, at phase 180°, the terminal OUT2A is connected to the input terminal INB and the terminal OUT2B is connected to the input terminal INA so that OUT2B-OUT2A shown in FIG. 9 (D) is obtained. As a result, the differential amplifier circuit 76 outputs OUT2A-OUT2B or OUT2B-OUT2A depending on rotor phase and the induced voltage shown in FIG. 9 (E) can be monitored as one pattern of waveform rising to the right. Thus, this obviates the need to prepare the drive current adjustment circuit 36 to handle two patterns of waveforms.

Since the drive current adjustment circuit 36 retains rotor phase information on the rotor 200, the switch 72 is appropriately switched in accordance with control of the drive current adjustment circuit 36.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A driver circuit for a stepping motor, said stepping motor comprising two coils having different phases of drive voltages applied to the two coils, said two coils drive a rotor;
   induced voltage generated at one of two said coils is detected in a high impedance period where said one of two said coils is in a high impedance state;
   magnitude of motor drive current supplied to the two coils is controlled in accordance with the state of the detected induced voltage; and
   for each of said two coils, prior to entering the high impedance period from the drive state supplying said motor drive current, a short-circuit period is provided by short-circuiting both terminals of said coil.

2. A driver circuit according to claim 1, wherein:
   proportion of the short-circuit period with respect to a total period of said short-circuit period and high impedance period is 50% or less.

3. A driver circuit according to claim 1, wherein:
   conduction to one coil is disabled for a predetermined period near an inverting timing for polarity of drive voltage applied to one coil and this period for disabling conduction is said short-circuit period and high impedance period.

4. A driver circuit according to claim 3, wherein:
   said predetermined period includes said inverting timing.

5. A driver circuit according to claim 1, wherein:
   for said induced voltage detected in said high impedance period, zero cross is detected and on the basis of timing of the detected zero cross, magnitude of motor drive current supplied to the two coils is controlled.

* * * * *